(12) United States Patent
Baek

(10) Patent No.: US 12,513,082 B2
(45) Date of Patent: Dec. 30, 2025

(54) MULTIPLE DATA TRANSMISSION METHOD AND MULTIPLE DATA TRANSMISSION SYSTEM

(71) Applicant: KOREA AEROSPACE RESEARCH INSTITUTE, Daejeon (KR)

(72) Inventor: Hyun Chul Baek, Daejeon (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 357 days.

(21) Appl. No.: 18/028,564

(22) PCT Filed: Dec. 31, 2020

(86) PCT No.: PCT/KR2020/019336
§ 371 (c)(1),
(2) Date: Mar. 27, 2023

(87) PCT Pub. No.: WO2022/065605
PCT Pub. Date: Mar. 31, 2022

(65) Prior Publication Data
US 2023/0362085 A1 Nov. 9, 2023

(30) Foreign Application Priority Data
Sep. 28, 2020 (KR) .................. 10-2020-0126166

(51) Int. Cl.
*H04L 45/74* (2022.01)
(52) U.S. Cl.
CPC .................. *H04L 45/74* (2013.01)
(58) Field of Classification Search
None
See application file for complete search history.

(56) References Cited

U.S. PATENT DOCUMENTS

| | | | | |
|---|---|---|---|---|
| 2010/0150155 | A1* | 6/2010 | Napierala | H04L 45/00 370/390 |
| 2018/0295638 | A1* | 10/2018 | Sullivan | H04W 72/569 |
| 2020/0274818 | A1* | 8/2020 | Hu | H04L 47/2441 |

FOREIGN PATENT DOCUMENTS

| | | |
|---|---|---|
| JP | H09-181851 | 7/1997 |
| JP | H10-222480 | 8/1998 |

(Continued)

OTHER PUBLICATIONS

Hyunchul Baek et al., "A Study on the transfer method of data between networks using fixed packets", KSAS 2020 Spring Conference, Jul. 9, 2020, with English translation thereof, pp. 1-6.

*Primary Examiner* — Christine T Duong
(74) *Attorney, Agent, or Firm* — JCIPRNET

(57) ABSTRACT

A multiple data transmission method and a multiple data transmission system are disclosed. A multiple data transmission system, according to one embodiment of the present invention, comprises: an identification unit for identifying, from among a plurality of separated networks, a first network to which a transmission device requesting data transmission belongs; a generation unit for generating a data packet by adding a destination address set for the first network as a header to data transmitted from the transmission device; and a transmission unit for transmitting the data packet to a reception device identified by the destination address, through a transmission path which connects the first network and a second network to which the reception device belongs.

11 Claims, 8 Drawing Sheets

(56) References Cited

FOREIGN PATENT DOCUMENTS

| | | |
|---|---|---|
| KR | 10-2001-0060015 | 7/2001 |
| KR | 10-0874152 | 12/2008 |
| KR | 10-2010-0073707 | 7/2010 |
| KR | 10-2018-0118334 | 10/2018 |
| KR | 10-2019-0000781 | 1/2019 |
| KR | 10-2006149 | 8/2019 |

\* cited by examiner

FIG. 5A

| Minor Frame | M/F No | 1<br>0A | 2<br>0B | 3<br>0C | 4<br>0D | 5<br>0E | 6<br>0F | 7<br>0G | 8<br>0H | 9<br>0K | 10<br>0L | 23<br>0Y | 24<br>0L |
|---|---|---|---|---|---|---|---|---|---|---|---|---|---|
| 1 | 01 | A-1<br>(190) | A-2<br>(40) | A-3<br>(40) | A-4<br>(40) | A-5<br>(50) | A-6<br>(40) | | | | U_01<br>(100) | T_01<br>(10000) | SI_01<br>(89500) |
| 2 | 02 | B-1<br>(80) | B-2<br>(80) | B-3<br>(80) | B-4<br>(80) | B-5<br>(80) | | | | | U_02<br>(100) | T_02<br>(10000) | SI_02<br>(89500) |
| 3 | 03 | C-1<br>(70) | C-2<br>(40) | C-3<br>(40) | | | | | | | U_03<br>(40) | T_03<br>(10000) | SI_03<br>(89810) |
| 4 | 04 | D-1<br>(10000) | D-2<br>(400) | D-3<br>(10000) | D-4<br>(10000) | D-5<br>(10000) | | | | | U_04<br>(10000) | T_04<br>(10000) | SI_04<br>(39600) |
| 5 | 05 | E-1<br>(350) | E-2<br>(3000) | E-3<br>(350) | | | | | | | U_05<br>(900) | T_05<br>(10000) | SI_05<br>(85400) |
| 6 | 06 | F-1<br>(20000) | F-2<br>(20000) | F-3<br>(40) | F-4<br>(350) | | | | | | U_06<br>(10000) | T_06<br>(10000) | SI_016<br>(39610) |
| 7 | 07 | G-1<br>(350) | G-2<br>(350) | G-3<br>(350) | G-4<br>(350) | G-5<br>(350) | G-6<br>(350) | G-7<br>(350) | | | U_07<br>(600) | T_07<br>(10000) | SI_07<br>(86950) |
| 8 | 08 | H-1<br>(450) | H-2<br>(12000) | H-3<br>(10000) | H-4<br>(11000) | H-5<br>(600) | H-6<br>(10000) | H-7<br>(11000) | H-8<br>(10000) | | U_08<br>(17000) | T_08<br>(10000) | SI_08<br>(8950) |
| 9 | 09 | I-1<br>(4000) | I-2<br>(11000) | I-3<br>(5000) | I-4<br>(11000) | I-5<br>(11000) | I-6<br>(11500) | I-6<br>(4000) | I-6<br>(5500) | I-6<br>(9000) | U_09<br>(18000) | T_09<br>(10000) | SI_09<br>(0) |
| 10 | 10 | J-1<br>(40) | J-2<br>(70) | J-3<br>(40) | J-4<br>(50) | J-5<br>(50) | J-6<br>(4500) | J-7<br>(50) | | | U_10<br>(1200) | T_10<br>(10000) | SI_10<br>(84000) |
| 11 | 11 | K-1<br>(250) | K-2<br>(2000) | K-3<br>(3000) | K-4<br>(350) | K-5<br>(40) | K-6<br>(4000) | K-7<br>(450) | K-8<br>(250) | K-9<br>(2500) | U_11<br>(3200) | T_11<br>(10000) | SI_11<br>(73960) |
| 12 | 12 | L-1<br>(1500) | L-2<br>(40) | L-3<br>(40) | L-4<br>(4000) | L-5<br>(4500) | L-6<br>(40) | | | | U_12<br>(2500) | T_12<br>(10000) | SI_12<br>(77380) |

※U:Undefined packet ※T:Telemetry ※SI:Satellite image

| File | Size | Folder | Modification date | Progress |
|---|---|---|---|---|
| Study on effectiveness of network separation policy for financial companies.pdf | 1.53MB | C:₩User₩sn100W... | Jan. 26, 2020 am | 100% |
| Technical trend on machine learning and deep learning.pdf | 1.43MB | C:₩User₩sn100W... | Jan. 23, 2020 am | 100% |
| Study on factors of performance degradation of internal network.pdf | 1.16MB | C:₩User₩sn100W... | Jan. 23, 2020 pm | 100% |
| Study on network virtualization.pdf | 2.46MB | C:₩User₩sn100W... | Jan. 23, 2020 am | 100% |
| Effective knowledge administration in network separation environment.pdf | 1.06MB | C:₩User₩sn100W... | Jan. 26, 2020 am | 100% |
| ... | ... | ... | ... | ... |

MULTIPLE DATA TRANSMISSION METHOD AND MULTIPLE DATA TRANSMISSION SYSTEM

CROSS-REFERENCE TO RELATED APPLICATION

This application is a 371 application of the International PCT application serial no. PCT/KR2020/019336, filed on Dec. 31, 2020, which claims the priority benefit of Korea application serial no. 10-2020-0126166, filed on Sep. 28, 2020. The entirety of each of the above-mentioned patent applications is hereby incorporated by reference herein and made a part of this specification.

TECHNICAL FIELD

The following description relates to a multiple data transmission method, and more specifically, to improving transmission efficiency through multiple data transmission in a network separation environment.

BACKGROUND ART

Security accidents, such as a paralyzed internal network or a destroyed system due to malicious code infection and an insider's information leakage, may generally occur since a user's personal computer (PC) is connected to the external Internet.

Therefore, the concept of network separation, which divides a PC environment into the Internet and an intranet, has been introduced to fundamentally block malicious code from flowing into an internal system and prevent important information in the internal system from being leaked to the external Internet.

That is, network separation may block a network environment of internal work from the external Internet and block an environment connected to the external Internet from accessing an internal intranet.

The government and public institutions have applied the network separation since 2008. Since then, the financial sector and companies handling personal information have been required to apply the network separation to PCs accessing a personal information processing system under the Information and Communications Network Act.

Although network separation that separates an internal intranet for business (hereinafter, referred to as a 'business network') from the external Internet (hereinafter, referred to as 'Internet') has prevented leakage of internal information related to business and blocked the threat of external hacking, the network separation has also increased the inconvenience of internal users due to the difficulty in transmitting data between networks.

For this reason, research is being conducted to perform limited-yet-efficient data transmission between networks in a network separation environment. For example, various methods have been proposed to transmit data between the business network and the Internet with internal security strengthened by using an automatic transfer switch, a relay system, a shared storage, a dedicated cable, a security Universal Serial Bus (USB), a one-way system, a network connection system, and the like.

However, even when data is transmitted between networks in a limited manner by using the methods described above, there may be security vulnerabilities. For example, when a security USB, which is allowed to be used, itself is infected with malicious code, there is a risk that malicious code may infiltrate a business network during data exchange. In addition, when a file downloaded from the Internet is indirectly transmitted to a business network through a cable or linked system, there may be risks of data leakage by a virus infection to a PC of the business network or intentional data leakage by an internal employee.

In order to alleviate such risks, a physical one-way transmission system has been proposed which removes a communication line between a business network and the Internet and provides a data transmission service in one direction by using a one-way cable. However, the physical one-way transmission system may have risks of information leakage and hacking since data may be transmitted through a secure USB in a reverse direction. Accordingly, there is a trend of gradual transition to a two-way network connection system which is physically disconnected.

FIG. 1 is a diagram illustrating a bidirectional data transmission system in a network separation environment, according to a conventional embodiment. FIG. 2A and FIG. 2B are diagrams illustrating an Open Systems Interconnection (OSI) layer supported by a bidirectional data transmission system in a network separation environment, according to a conventional embodiment.

Referring to FIG. 1, a bidirectional data transmission system 100 in a conventional network separation environment may be constructed in a dual form of physical forward transmission equipment and reverse transmission equipment by utilizing two sets of an existing one-way system.

The physical forward transmission equipment may be an upper one-way data transmission system that transmits data in a physically forward direction from a business network (a security area) to the Internet (a non-security area) and may include an intranet forward transmission control server and an Internet forward reception control server.

In addition, the reverse transmission equipment may be a lower one-way data transmission system that transmits data in a physically reverse direction from the Internet (the non-security area) to the business network (the security area) and may include an Internet reverse transmission control server and an intranet reverse reception control server.

The bidirectional data transmission system 100 may fundamentally block hacking due to bi-directional communication since the bidirectional data transmission system 100 provides a communication session that physically separates a line between the business network and the Internet.

In addition, when the bidirectional data transmission system 100 transmits data in a forward direction from the security area to the non-security area, the bidirectional data transmission system 100 may provide a file content filtering function to prevent leakage of internal information. When the bidirectional data transmission system 100 transmits data in a reverse direction, the bidirectional data transmission system 100 may provide an IP/Port filtering function along with a malicious code filtering function, so that only authorized systems may be interlocked.

In addition, the bidirectional data transmission system 100 may comply with the requirements for national information protection since the bidirectional data transmission system 100 may perform integrated security management in the business network (internal network) corresponding to the security area for each of an internal transmission device and an external reception device, which are the forward transmission equipment, and an external transmission device and an internal reception device, which are the reverse transmission equipment. In addition, a communication request may be made only from the security area to the non-security area.

Since existing one-way transmission equipment may not receive acknowledgment (ACK) upon transmission of data, when a failure of the reception equipment occurs, the existing one-way transmission equipment may continue to transmit data without recognizing the failure, which may cause data loss.

Accordingly, the bidirectional data transmission system 100 may not support all of the OSI 7 layers shown in FIG. 2A but may strengthen the security environment through bidirectional data transmission that supports only a physical layer and a data link layer shown in FIG. 2B.

That is, in the bidirectional data transmission system 100, the transmission equipment may recognize the condition of the reception equipment and then re-transmit data by using the characteristics of the physical layer to ensure reliability of the transmitted data. However, such a method may reduce transmission efficiency in a network since the method transmits a piece of data at a time.

However, when the data volume to be transmitted gradually increases or a transmission line is occupied by a large volume of data, such as telemetry or a satellite image, data urgently required may not be transmitted between networks until the data transmission is completed, which may undermine efficient transmission of data between networks in the bi-directional data transmission system 100 of the conventional method.

Accordingly, there may be need for a method of changing the design structure of a data packet to enable simultaneous transmission of multiple data through one transmission path instead of bidirectional transmission.

DISCLOSURE OF THE INVENTION

Technical Goals

An embodiment of the present invention may improve efficiency of data transmission in a network separation environment by changing the packet structure of data requested to transmit between separated networks for simultaneous transmission through a single transmission path.

When data is transmitted between separated networks, an embodiment of the present disclosure may transmit a data packet generated by adding a destination address specified in a network of transmitting data as a header of the data to thus transmit the data packet to a system designated in a network of receiving the data, so that security may be strengthened even during simultaneous data transmission between separated networks through one transmission path.

Technical Solutions

A multiple data transmission system, according to an embodiment of the present invention, includes an identification unit for identifying, from among a plurality of separated networks, a first network to which a transmission device requesting data transmission belongs, a generation unit for generating a data packet by adding a destination address set for the first network as a header to data transmitted from the transmission device, and a transmission unit for transmitting the data packet to a reception device identified by the destination address, through a transmission path which connects the first network and a second network to which the reception device belongs.

In addition, a multiple data transmission method according to an embodiment of the present invention includes identifying, from among a plurality of separated networks, a first network to which a transmission device requesting data transmission belongs, generating a data packet by adding a destination address set for the first network as a header to data transmitted from the transmission device, and transmitting the data packet to a reception device identified by the destination address, through a transmission path which connects the first network and a second network to which the reception device belongs.

Effects

The present disclosure may change the packet structure of data requested to transmit and transmit the data simultaneously between separated networks through a single transmission path, thereby improving the efficiency of data transmission.

The present disclosure may generate a data packet by adding a destination address specified in a network of transmitting data as a header of data and thus transmit the data packet to a system designated in a network of receiving the data, thereby strengthening security even during simultaneous data transmission between separated networks through one transmission path.

BRIEF DESCRIPTION OF DRAWINGS

FIG. 5A is a diagram illustrating a structure of a data packet in a multiple data transmission system according to an embodiment.

FIG. 6 is a diagram illustrating an example of multiple data transmission in a multiple data transmission system according to an embodiment.

BEST MODE FOR CARRYING OUT THE INVENTION

Figure 1:
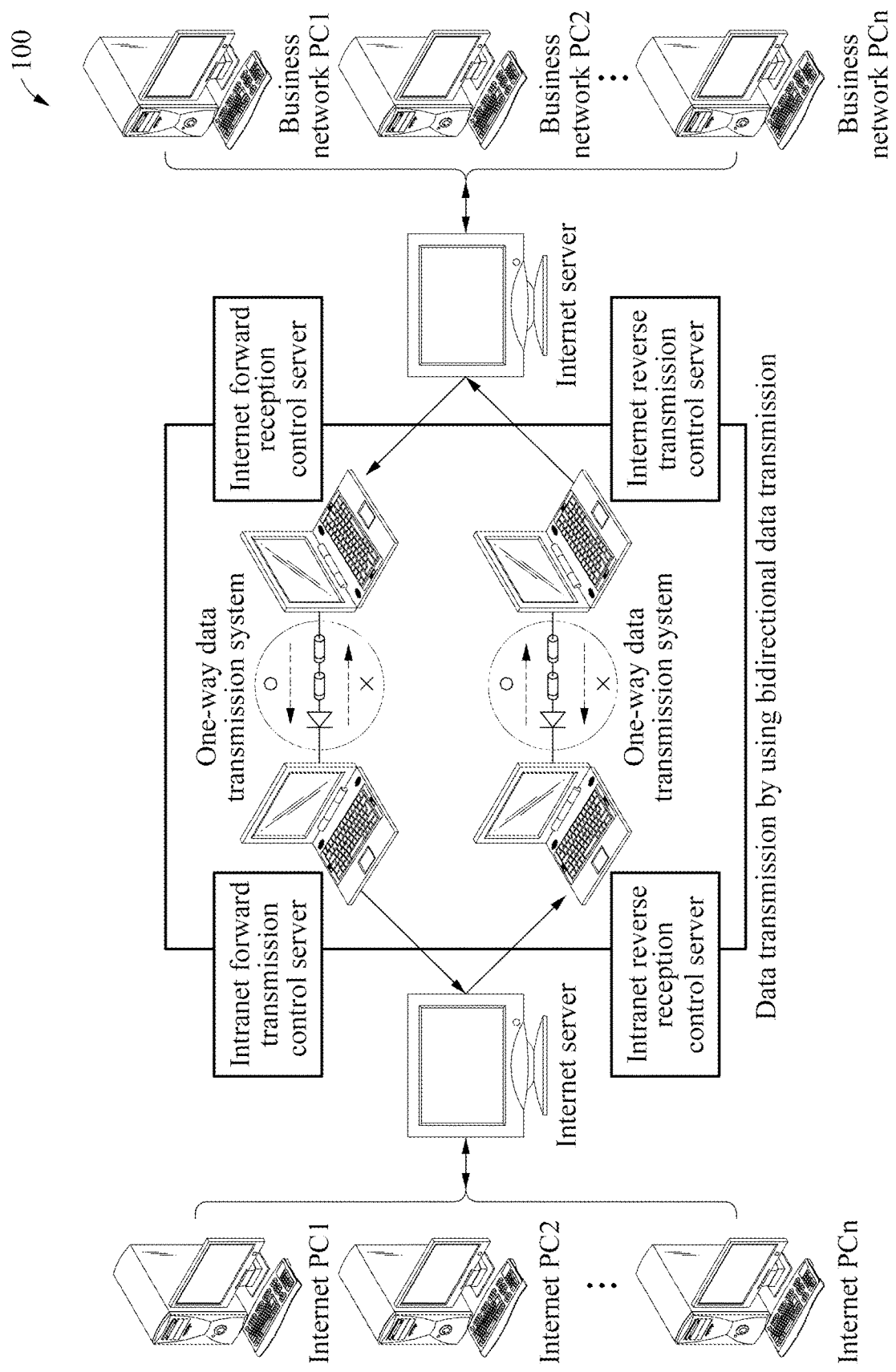
FIG. 1 is a diagram illustrating a bidirectional data transmission system in a network separation environment, according to a conventional embodiment.
Figure 2A:
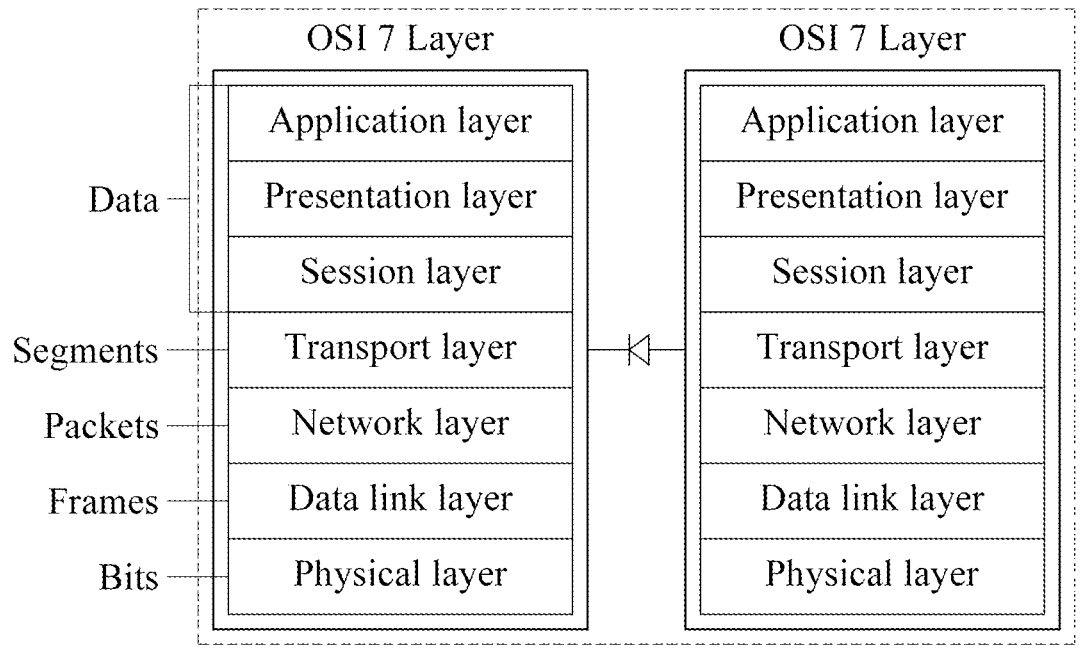
FIG. 2A and FIG. 2B are diagrams illustrating an Open Systems Interconnection (OSI) layer supported by a bidirectional data transmission system in a network separation environment, according to a conventional embodiment.
Figure 2B:
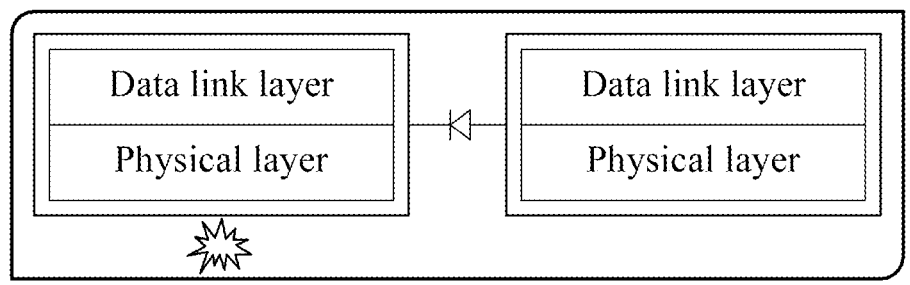

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the present disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Figure 3:
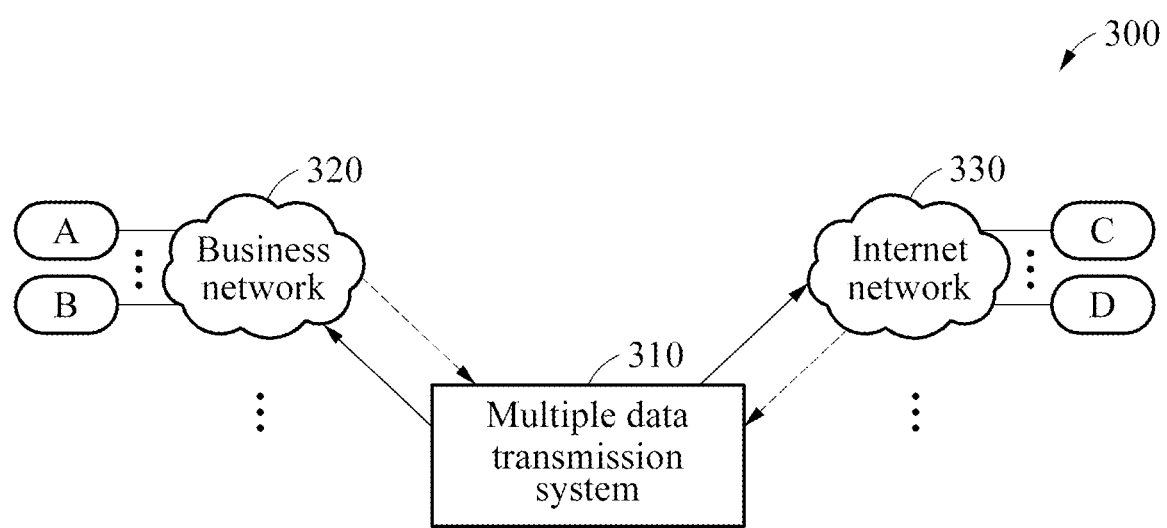
FIG. 3 is a diagram illustrating a network separation environment including a multiple data transmission system, according to an embodiment.

FIG. 3 is a diagram illustrating a network separation environment including a multiple data transmission system, according to an embodiment.

Referring to FIG. 3, a multiple data transmission system 310 in a network separation environment 300 may be a transmission system to improve data transmission efficiency between separated networks.

As illustrated, the network separation environment 300 may be implemented as a physically separated network by removing a communication line between a business network 320 and an Internet 330.

Here, the business network 320 may be implemented as an internal intranet that needs security maintenance, and the Internet 330 may be implemented as an external Internet.

In addition, the business network 320 may be implemented as a satellite network connecting a plurality of satellites.

In this case, devices A and B in the business network 320 may be transmission devices for transmitting data to the Internet network 330 and include satellites 'K2', 'K3', 'K3A', 'K5', and 'C-1' or a system provided in each satellite.

The Internet 330 may be implemented as a network connecting a plurality of systems provided in a ground station (GS) communicating with the satellite network.

Devices C and D in the Internet network 330 may be reception devices for receiving data from the business network 320 and include a telemetry processing system, a satellite image processing system, and a Mission Planning System (MPS), and the like.

In the network separation environment 300, the multiple data transmission system 310 may transform data to be transmitted into a data packet having a structure illustrated in Tables 1 and 2 to be described below and then transmit the transformed data, in order to efficiently transmit data between the business network 320 and the Internet 330, in particular, from the business network 320 to the Internet 330, without security vulnerabilities.

Specifically, the multiple data transmission system 310 may check the business network 320 to which the transmission device A that requests data transmission belongs and generate a data packet by adding a destination address set for the business network 320 as a header.

For example, when a device for processing data transmitted from the transmission device A in the business network 320 is determined to be the reception device C in the Internet 330, the multiple data transmission system 310 may set the address information of the reception device C as a destination address corresponding to the transmission device A in the business network 320 and add the destination address as a header to thus generate a data packet.

The generated data packet may be transmitted along a transmission path from the business network 320 to the reception device C in the Internet 330.

In addition, when the transmission of additional data is requested from another transmission device, which is the transmission device B, during the transmission of the data packet through the transmission path, the multiple data transmission system 310 may share the transmission path and thus simultaneously transmit a data packet additionally generated, thereby improving data transmission efficiency.

Specifically, when the transmission of additional data is requested, the multiple data transmission system 310 may count the number of transmission devices currently transmitting data packets through the transmission path, and when the counted number of transmission devices is less than an allowable value (e.g., '15'), the multiple data transmission system 310 may share the transmission path to thus simultaneously transmit an additional data packet through the transmission path.

When the counted number of transmission devices is greater than or equal to the allowable value (e.g., '15'), the multiple data transmission system 310 may wait for the transmission of the additional data packet until the transmission of the data packet is completed and the counted number of transmission devices becomes less than the allowable value.

Here, the number of transmission devices capable of simultaneously transmitting a data packet by sharing the transmission path may be determined based on the number of satellites. As the number of satellites increases, the allowable value may also increase.

Figure 4:
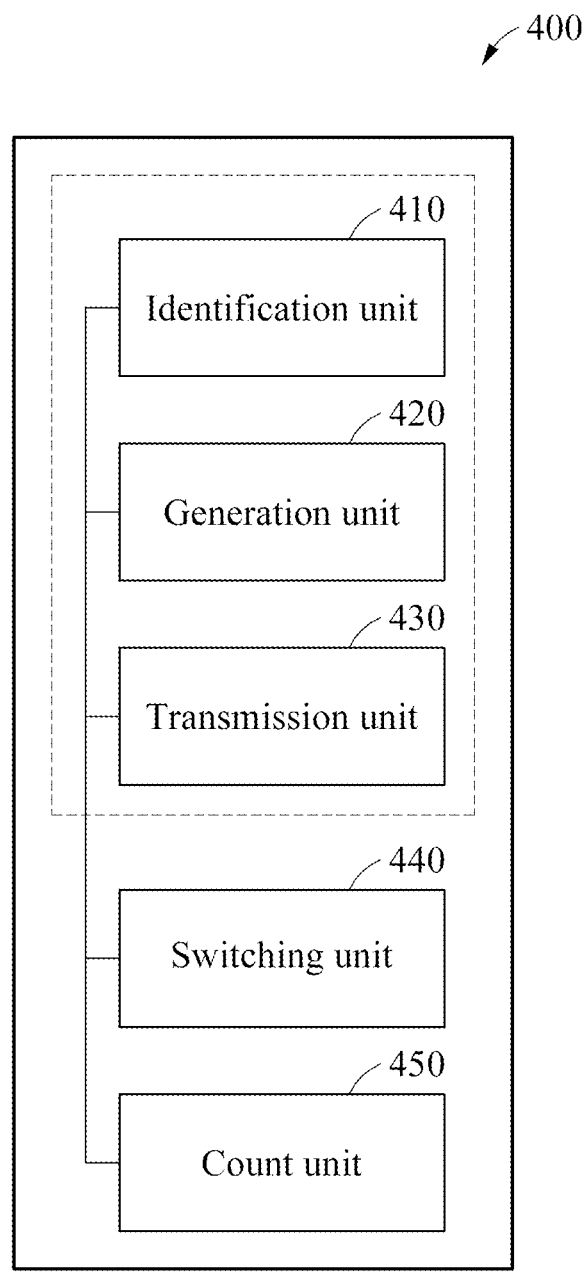
FIG. 4 is a block diagram illustrating a configuration of a multiple data transmission system according to an embodiment.

FIG. 4 is a block diagram illustrating a configuration of a multiple data transmission system according to an embodiment.

Referring to FIG. 4, a multiple data transmission system 400 according to an embodiment may include an identification unit 410, a generation unit 420, and a transmission unit 430. In addition, according to an embodiment, the multiple data transmission system 400 may be configured by adding each of a switching unit 440 and a count unit 450.

The identification unit 410 may identify a first network, to which a transmission device (e.g., a 'satellite') that requests data transmission belongs, among a plurality of separated networks.

The generation unit 420 may generate a data packet by adding a destination address set for the first network as a header to data transmitted from the transmission device.

For example, referring to FIG. 1, when the device for processing data transmitted from the transmission device A in the business network 320 is determined to be the reception device C in the Internet 330, the generation unit 420 may set address information of the reception device C as a destination address corresponding to the transmission device A in the business network 320 and add the destination address as a header to data requested to be transmitted by the transmission device A, thereby generating a data packet.

Accordingly, according to the present disclosure, the data packet may be generated by adding the destination address specified by the network of transmitting the data as the header, and the data packet may be transmitted to a system designated in the network of receiving the data, so that security may be strengthened even during simultaneous data transmission between separated networks through one transmission path.

For example, when the transmission of a large amount of telemetry is requested from the transmission device, the generation unit 420 may divide the large amount of data into a plurality of pieces, considering a data size allocated in one data packet, and add the header to each of the divided pieces of the large amount of the data to thus generate a plurality of data packets.

In addition, when the transmission of a large amount of satellite image data is requested from the transmission device, the generation unit 420 may expand the allocated data size by a predetermined value and generate the data packets by using an undefined field in the data packets, which correspond to a predetermined ratio (e.g., 25%) of the total size of the data packets.

In this case, the transmission unit 430 to be described below may sequentially or simultaneously transmit the plurality of generated data packets through the transmission path.

The transmission unit 430 may transmit the data packets to a reception device through the transmission path connecting the first network to a second network to which the reception device identified by the destination address belongs.

Here, the transmission path may be a physical one-way transmission path from the first network to the second network or may be designed to enable physical reverse transmission from the second network to the first network.

In addition, the transmission path between the first network and the second network may be provided with multiple paths instead of a single path. In this case, the transmission unit 430 may select one path as the transmission path from among the multiple paths connecting the first network to the second network in the plurality of networks.

According to an embodiment, the multiple data transmission system 400 may further include the switching unit 440.

The switching unit 440 may be provided in the second network of receiving the data packets transmitted from the first network and be configured to switch the received data packets and transmit the switched data packets to a system designated in the second network.

For example, when transmission of satellite image data is requested from an Image Collection Planning System (ICPS) in the first network, the transmission unit 430 may transmit data packets, which are generated to include the satellite image data, to the second network through the transmission path. In this case, the switching unit 440 may transfer the data packets, which are transmitted to the second network, to a Mission Planning System (MPS), corresponding to the ICPS, in the second network.

For example, during the transmission of the data packet through the transmission path, when the transmission of data packets is requested from a transmission device in a network other than the first network, the transmission unit 430 may share the transmission path and thus transmit additional data packets generated in response to a request for the transmission of the additional data to a network including a reception device of an added destination address as a header in the additional data packets.

According to an embodiment, the multiple data transmission system 400 may be configured by adding the count unit 450.

The count unit 450 may count the number of transmission devices transmitting data packets through the transmission path. When the counted number of transmission devices is less than an allowable value, the transmission unit 430 may simultaneously transmit additional data packets along with the data packets through the transmission path.

For example, the transmission unit 430 may simultaneously transmit multiple data 600 within the allowable value (51/55) as shown in FIG. 6 even in a separated network environment.

As described above, according to the present disclosure, when data transmission is requested in a separated network environment, the efficiency of data transmission may be improved by changing the structure of a data packet for simultaneous data transmission through a single transmission path connecting each network.

FIG. 5A is a diagram illustrating a structure of a data packet in a multiple data transmission system according to an embodiment.

Referring to the table of FIG. 5A, data packets 500 may include minor frames and data items.

In the table, a column may indicate a minor frame and a row may indicate a data item to be transmitted in each system.

The minor frames may be illustrated from 1 to 12 but may be designed to be expandable to 13 or 14 for system expansion (satellite expansion).

The data items may also be designed variably according to each data size.

The size of the data packets 500 may be determined by adding a header and a tailor to data to be transmitted.

For example, each of the data packets 500 may include a header (24 bytes), data to be transmitted, and a tailor (12 bytes).

In addition, the data packet may be designed in a size including a margin of about 10% based on a prior analysis result.

That is, an undefined packet (U) 530 corresponding to 25% of the total size of each system (the minor frame) may be set, considering future scalability. For example, when the data packet 510 of a minor frame 01 is 400 bytes, the U 530 may be set to about 100 bytes.

In addition, fixed and variable packets may be allocated to telemetry (T) 521 and a satellite image (SI) 522 having a relatively large volume.

For example, the T 521 may be allocated with a fixed size of 10,000 bytes and the SI 522 may be allocated differently for each minor frame.

That is, the SI 522 may be allocated to a part other than the data packet 510 of each minor frame, the U 530, and the T 521, based on the total data transmission bandwidth. Accordingly, the SI 522 may be expanded when the transmission bandwidth increases.

Figure 5B:
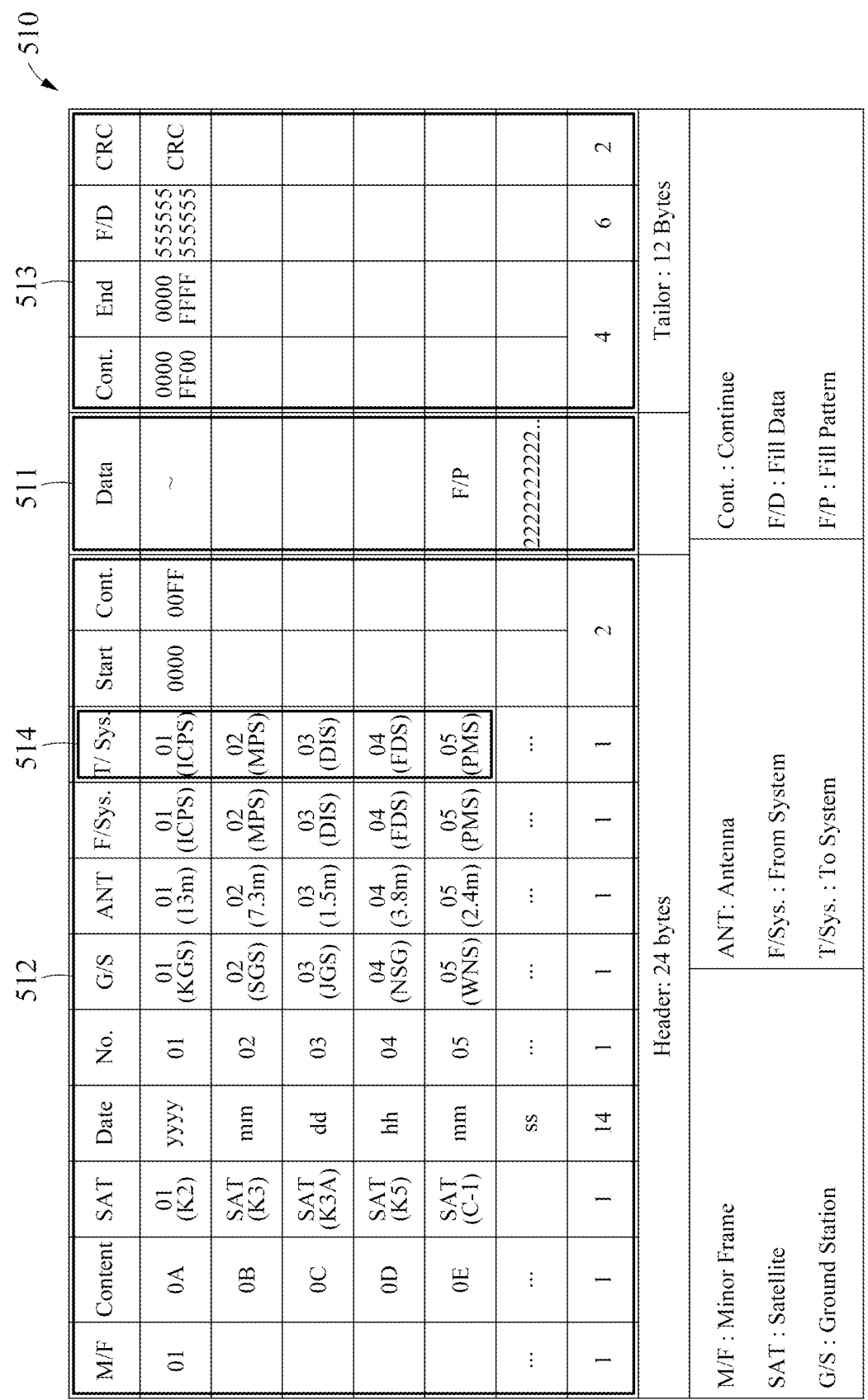
FIG. 5B is a diagram illustrating a detailed structure of the data packet in the multiple data transmission system according to an embodiment.

FIG. 5B is a diagram illustrating a detailed structure of the data packet in the multiple data transmission system according to an embodiment.

Referring to FIG. 5B, the data packet 510 of the minor frame 01 may include a header 512, data 511 to be transmitted, and a tailor 513.

The header 512 may include fields of a minor frame, a satellite (SAT), a date, a packet number (Packet No.), a ground station (G/S), an antenna (ANT), a source address (F/Sys), and a destination address (T/Sys) 514 and may be allocated in a size of 24 bytes.

The data 511 may include data to be transmitted by a transmission device corresponding to the F/Sys.

The tailor 513 may include fields of continue (Cont.), end (End), fill data (F/D), fill pattern (F/P), and cyclic redundancy check (CRC) and may be allocated in a size of 12 bytes.

For example, the data 511 of 'Content 0A' of the minor frame 01 may be an Image Collection Planning (ICP) file transmitted from an ICPS to an MPS and may refer to "A-1".

"A-1" may include all ICP files for each satellite, such as K3 or K5, and may be generated separately in time to transmit a file for only one satellite at a time.

For example, when a "K3_yyyymmddhhmmss_01.osl" file is transmitted, the data packet 510 may be expressed as "010A02 xxxxxxxxxxxxx 010002010000~0000FFFF555555555555XX".

This may refer to the Minor Frame '01', K3 satellite of Contents '0A', Year Month Date Hour Minute Second, Station and Antenna, which have not yet determined and thus are expressed as "00", first transmission of data (Fill Pattern for the variable is '222222~') from the MPS to the ICPS, and one file formed without successive files.

Based on this, the data packet 510 of data transmitted from the internal business network to the external Internet may be designed as shown in FIG. 5B, such that the data packet 510 may be transmitted to a designated system in the external Internet.

Figure 7:
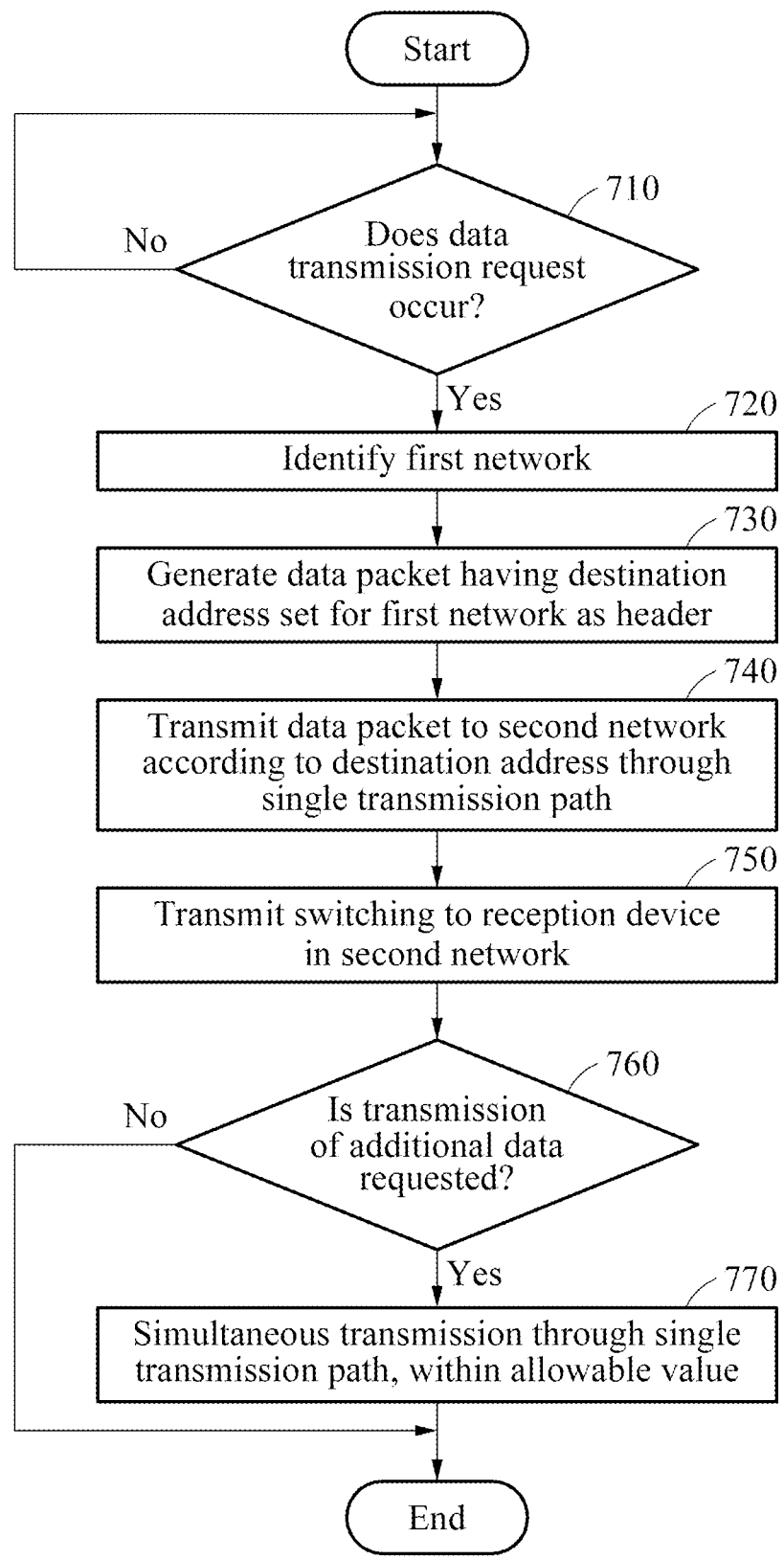
FIG. 7 is a flowchart illustrating a sequence of a multiple data transmission method according to an embodiment.

Hereinafter, FIG. 7 illustrates a detailed flowchart of a multiple data transmission system 400 according to an embodiment.

FIG. 7 is a flowchart illustrating a sequence of a multiple data transmission method according to an embodiment.

A multiple data transmission method according to an embodiment may be performed by the multiple data transmission system 400 described above.

Referring to FIG. 7, in operation 710, the multiple data transmission system 400 may identify whether a data transmission request occurs in a separated network environment.

When the data transmission request occurs, in operation 720, the multiple data transmission system 400 may identify a first network (e.g., a business network) to which a transmission device requesting data transmission belongs.

In operation 730, the multiple data transmission system 400 may generate a data packet by adding a destination address set for the first network as a header to data transmitted from the transmission device.

In operation 740, the multiple data transmission system 400 may transmit the data packet to a second network according to the destination address through a single transmission path.

In operation 750, the multiple data transmission system 400 may switch and transmit the data packet to a reception device in the second network.

In operation 760, the multiple data transmission system 400 may check whether the transmission of additional data is requested from another transmission device during the transmission of the data packet through the transmission path.

In operation 770, when the transmission of additional data is requested, the multiple data transmission system 400 may allow simultaneous transmission of an additional data packet through the single transmission path, within an allowable value.

For example, the multiple data transmission system 400 may count the number of transmission devices that are transmitting data packets through the transmission path. When the counted number of transmission devices is within an allowable value, the multiple data transmission system 400 may share the transmission path and thus simultaneously transmit the additional data generated according to the request for the transmission of the additional data, and when the counted number of transmission devices exceeds the allowable value, the multiple data transmission system 400 may wait until the transmission of the data packets being transmitted is completed.

As described above, according to the present invention, the efficiency of data transmission may be improved by changing the packet structure of data requested to transmit and enabling simultaneous transmission of data between separated networks through a single transmission path, thereby improving the efficiency of data transmission.

The methods according to the above-described embodiments may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described example examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

The invention claimed is:

1. A multiple data transmission system comprising:
a processor; and
a memory storing instructions, wherein the instructions, when executed by the processor, cause the multiple data transmission system to:
identify, from among a plurality of separated networks, a first network to which a transmission device requesting data transmission belongs;
generate a data packet by adding a destination address set for the first network as a header to data transmitted from the transmission device;
transmit the data packet to a reception device identified by the destination address, through a transmission path which connects the first network and a second network to which the reception device belongs;
during the transmitting of the data packet through the transmission path when additional data transmission is requested from a transmission device in a network other than the first network;
share the transmission path and thus transmit an additional data packet, which is generated in response to the request for the additional data transmission, to a network comprising a reception device of a destination address added as a header in the additional data packet;
count a number of transmission devices that are transmitting data packets through the transmission path; and
simultaneously transmit the additional data packet along with the data packet through the transmission path when the counted number of transmission devices is less than an allowable value.

2. The multiple data transmission system of claim 1, wherein the instructions, when executed by the processor, cause the multiple data transmission system to:
when transmission of telemetry as a large amount of data is requested from the transmission device,
divide the large amount of data into a plurality of pieces, considering a data size allocated to one data packet, and generate a plurality of data packets by adding the header to each of the divided pieces of the large amount of data; and
sequentially or simultaneously transmit the plurality of generated data packets through the transmission path.

3. The multiple data transmission system of claim 2, wherein the instructions, when executed by the processor, cause the multiple data transmission system to:
when transmission of a satellite image as a large amount of data is requested from the transmission device,
generate the data packet by expanding the allocated data size by a predetermined value, using an undefined field within the data packet, which corresponds to a predetermined ratio of a total size of the data packet.

4. The multiple data transmission system of claim 1, wherein the instructions, when executed by the processor, cause the multiple data transmission system to:
when transmission of a satellite image is requested from an Image Collection Planning System (ICPS) in the first network,
transmit the data packet, which is generated to comprise the satellite image, to the second network through the transmission path; and
cause the data packet transmitted to the second network to be transmitted to a Mission Planning System (MPS) in the second network corresponding to the ICPS.

5. The multiple data transmission system of claim 1, wherein the instructions, when executed by the processor, cause the multiple data transmission system to:
select one path from among a plurality of paths connecting the first network to the second network in the plurality of networks, considering efficiency based on a transmission time of the data packet.

6. A multiple data transmission method comprising:
identifying, from among a plurality of separated networks, a first network to which a transmission device requesting data transmission belongs;
generating a data packet by adding a destination address set for the first network as a header to data transmitted from the transmission device; and
transmitting the data packet to a reception device identified by the destination address, through a transmission path which connects the first network and a second network to which the reception device belongs;
during the transmitting of the data packet through the transmission path when additional data transmission is requested from a transmission device in a network other than the first network;
sharing the transmission path and thus transmitting an additional data packet, which is generated in response to the request for the additional data transmission, to a network comprising a reception device of a destination address added as a header in the additional data packet;
counting a number of transmission devices that are transmitting data packets through the transmission path; and
simultaneously transmitting the additional data packet along with the data packet through the transmission path when the counted number of transmission devices is less than an allowable value.

7. The multiple data transmission method of claim 6, further comprising: when transmission of telemetry as a large amount of data is requested from the transmission device,
dividing the large amount of data into a plurality of pieces, considering a data size allocated to one data packet; and
sequentially or simultaneously transmitting a plurality of data packets generated by adding the header to each of the divided pieces of the large amount of data.

8. The multiple data transmission method of claim 7, further comprising, when transmission of a satellite image as a large amount of data is requested from the transmission device,
generating the data packet by expanding the allocated data size by a predetermined value, using an undefined field within the data packet, which corresponds to a predetermined ratio of a total size of the data packet.

9. The multiple data transmission method of claim 6, wherein, when transmission of a satellite image is requested from an Image Collection Planning System (ICPS) in the first network, the transmitting of the data packet to the reception device comprises:
transmitting the data packet, which is generated to comprise the satellite image, to the second network through the transmission path; and
causing the data packet transmitted to the second network to be transmitted to a Mission Planning System (MPS) in the second network corresponding to the ICPS.

10. The multiple data transmission method of claim 6, further comprising selecting one path from among a plurality of paths connecting the first network to the second network in the plurality of networks, considering efficiency based on a transmission time of the data packet.

11. A non-transitory computer-readable storage medium storing instructions that, when executed by a processor, cause the processor to perform the method of claim 6.

\* \* \* \* \*